United States Patent [19]

Stoneback et al.

[11] Patent Number: 5,835,844
[45] Date of Patent: Nov. 10, 1998

[54] BIDIRECTIONAL CATV SYSTEM HAVING LOSSES FOR EQUALIZING UPSTREAM COMMUNICATION GAIN

[75] Inventors: Dean A. Stoneback, Souderton; William F. Beck, Hatboro; Zheng F. Huang, Horsham, all of Pa.

[73] Assignee: General Instrument Corporation, Horsham, Pa.

[21] Appl. No.: 580,633

[22] Filed: Dec. 29, 1995

[51] Int. Cl.⁶ .................................................. H04N 7/14
[52] U.S. Cl. .................. 455/5.1; 348/12; 348/13
[58] Field of Search .................. 348/6, 7, 8, 12, 348/13; 455/3.1, 4.1, 4.2, 5.1, 6.1; 380/7, 10; 375/229, 230, 231–236; 333/100, 109, 110, 111, 24 R, 28 R; 345/326, 327; H04N 7/10, 7/14, 7/173

[56] References Cited

U.S. PATENT DOCUMENTS

| | | | |
|---|---|---|---|
| 3,983,486 | 9/1976 | Rheinfelder | 455/6.1 |
| 4,488,126 | 12/1984 | Suthers | 333/18 |
| 4,633,202 | 12/1986 | Basile et al. | 455/5.1 |
| 5,058,198 | 10/1991 | Rocci et al. | 455/3 |
| 5,214,505 | 5/1993 | Robowsky et al. | 455/4.1 |
| 5,361,394 | 11/1994 | Shigihara | 455/5.1 |
| 5,485,630 | 1/1996 | Lee et al. | 455/4.1 |

FOREIGN PATENT DOCUMENTS

| | | | |
|---|---|---|---|
| WO8910663 | 11/1989 | WIPO | H04K 1/00 |
| WO915062 | 10/1991 | WIPO | H04B 1/06 |

*Primary Examiner*—Andrew I. Faile
*Assistant Examiner*—John W. Miller
*Attorney, Agent, or Firm*—Volpe and Koenig, P.C.

[57] ABSTRACT

A gain variance and ingress reduction system reduces the overall ingress of interferers for an entire CATV system return transmission path and allows a reduction in subscriber terminal return transmitter power. The system places a calculated loss at each subscriber tap location. By placing these losses at each subscriber location, the headend receives a more consistent return transmission path gain thereby reducing the terminal return transmitter power range requirement. In addition, the losses reduce return transmission path ingress.

21 Claims, 7 Drawing Sheets

Prior Art

Fig. 1

Prior Art

| | Loss from active to tap port @ 750 MHz | Loss from tap port to active @ 40 MHz |
|---|---|---|
| Tap 1 | 27 dB | 27 dB |
| Tap 2 | 25 dB | 21.2 dB |
| Tap 3 | 26 dB | 16.8 dB |
| Tap 4 | 27 dB | 9.3 dB |
| Difference between Tap 4 and Tap 1 | 0 dB | 17.7 dB |

| | Loss from active to eq out @ 750 MHz | Loss from eq out to active @ 40 MHz |
|---|---|---|
| Tap 1 | 27 dB | 27 dB |
| Tap 2 | 26 dB | 26.8 dB |
| Tap 3 | 27 dB | 27 dB |
| Tap 4 | 28 dB | 28.8 dB |
| Difference between Tap 4 and Tap 1 | 1 dB | 1.8 dB |

Fig. 6B

Flat Loss:

Fig. 7

Flat Loss with Notch:

Fig. 8

Equalizer Loss:

BIDIRECTIONAL CATV SYSTEM HAVING LOSSES FOR EQUALIZING UPSTREAM COMMUNICATION GAIN

BACKGROUND OF THE INVENTION

1. Field Of The Invention

This invention relates generally to cable television communication systems. More particularly, the invention relates to a system which reduces gain variances and noise ingress in the return transmission path of a bidirectional cable television communication system.

2. Description Of The Related Art

A number of different types of cable television (CATV) communication systems exist to provide a diversity of CATV services. Conventional one-way CATV systems primarily provide broadcast video services, which are sent over the CATV transmission network in a downstream direction, from a headend of a CATV system to a plurality of subscriber terminals. Bidirectional CATV systems have become commonplace in the industry as the diversity of services has grown. Pay-per-view channels are one example of bidirectional CATV services where the subscriber transmits information back to the headend regarding show selection. New services that are under development will rely on the full use and deployment of the return path communication.

Bidirectional CATV systems support both downstream and return path communication. Accordingly, individual subscribers may communicate with the headend, other subscribers, or service providers within the system. These systems also permit subscribers to select specific video programming or consumer services and pay only for those services which are used.

Typical CATV systems in the United States are capable of transporting a range of frequencies from approximately 5 MHz to 750 MHz. Signal frequencies above 50 MHz are commonly reserved for distributing signals in the downstream direction from a headend to subscriber terminals (forward frequencies). Signal frequencies below 40 MHz are commonly reserved for transporting signals in the return path direction from individual subscriber terminals to the headend (reverse frequencies). Signal frequencies between 40 and 50 MHz are used as a guard band to separate the upstream from the downstream service.

A CATV transmission distribution plant includes coaxial cables, signal couplers/splitters, amplifiers, and subscriber taps. When placed in the signal path, passive transmission devices attenuate the signal. Normally, the system is designed from the headend to each subscriber noting the signal losses and gains throughout the trunk, branch lines and subscriber drops.

The final distribution of the CATV signal to subscribers is usually via a coaxial cable that is tapped at specific locations to provide the subscriber drops. The signal gain from the headend to a subscriber terminal for forward frequencies and from the terminal to the headend for reverse frequencies will vary depending upon intervening devices and the length of the transmission due to inherent cable and device insertion loss. The signal attenuation varies with respect to frequency since the attenuation is greater at higher frequencies than at lower frequencies.

One of the primary goals in designing a cable distribution system is to provide the proper signal strength levels at a subscriber's tap. Normally, amplifiers are installed in the cable plant to periodically restore the signal strength lost due to cable attenuation and the burden of other CATV devices. The levels at the output of each amplifier are set to the same signal strength. This concept is known as unity gain. Since the coaxial cable causes greater attenuation at higher frequencies, the loss at the highest frequency typically determines the gain of an amplifier. The frequency response of a line amplifier is slightly tilted to the higher frequencies to anticipate the attenuation of higher frequencies. At a point in the cable plant where the high frequency loss is greater than design limits, a amplifier is inserted to restore all frequencies to unity gain.

A current technique used to provide uniform forward signal levels for a number of subscribers is to select a specific attenuation value for each subscriber tap. The tap values for each subsequent subscriber gradually decrease in attenuation since the coaxial cable also contributes to the signal attenuation due to transmission length.

Figure 1:
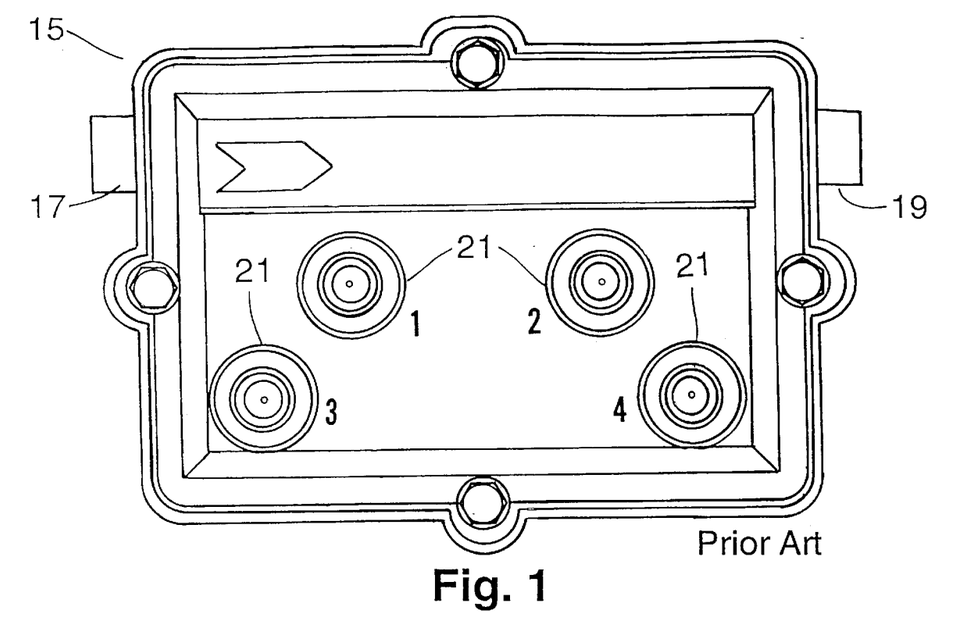
FIG. 1 is a prior art CATV subscriber tap.
Figure 2:
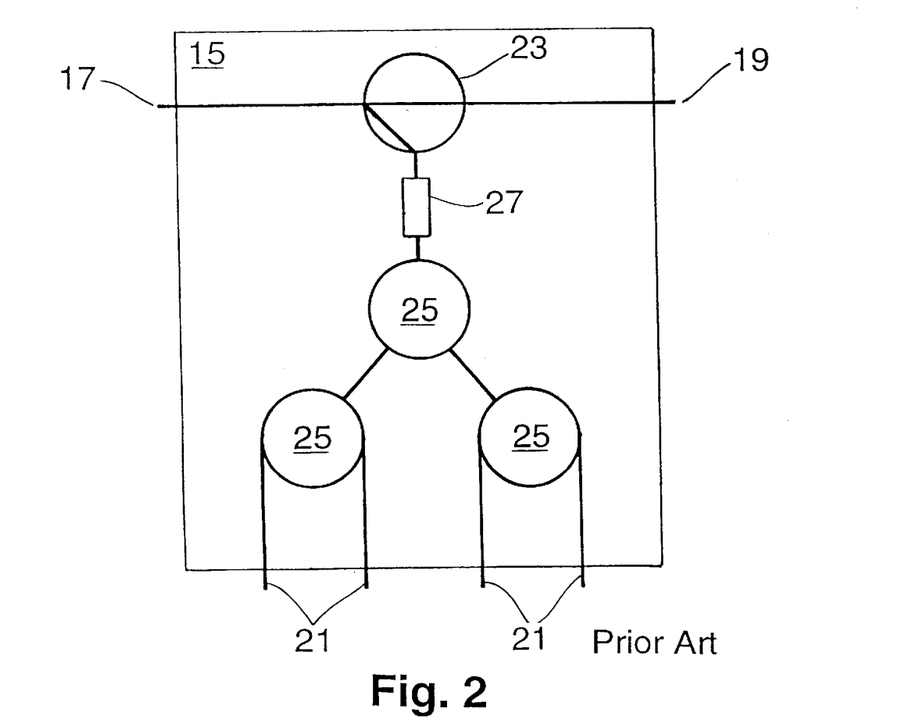
FIG. 2 is a block diagram of a prior art CATV subscriber tap.

Referring to FIG. 1, a prior art subscriber tap 15 includes an input signal port 17, an output signal port 19 and four subscriber tap "F" ports 21. FIG. 2 shows the electrical components of the subscriber tap 15. The input signal port 17 is coupled to the directional coupler 23 which passes the CATV signal to an output signal port 19 and to a signal splitter 25. The signal is split again depending on the number of tap "F" ports 21. To provide the various tap values, an attenuation value 27 can be inserted between the directional coupler 23 and the first signal splitter 25.

The downstream signal is attenuated by the tap value when accessed by each subscriber through a tap "F" port 21. The tap output port 19 is connected to the next tap 15 by another length of coaxial cable. Each subsequent tap value decreases in descending order resulting in the same signal level present at the last subscriber tap "F" port as was at the first tap. Calculation of the tap values is mainly based on the highest transported forward frequency. The downstream signal transmission is designed in this manner to ensure that proper signal strength levels are provided to each subscriber terminal.

However, for lower frequencies in the transmission spectrum, the tap output level increases at each successive tap. The loss at the highest frequency will be controlled by the tap port output values imposed by the system design. However, since the coaxial cable has less loss at lower frequencies, the tap output level at these frequencies varies greatly at every tap. This problem is evident to an even greater extent in the return path since only low frequencies are used. Therefore, there is a large variance in loss to each tap in the return direction.

Figure 3A:
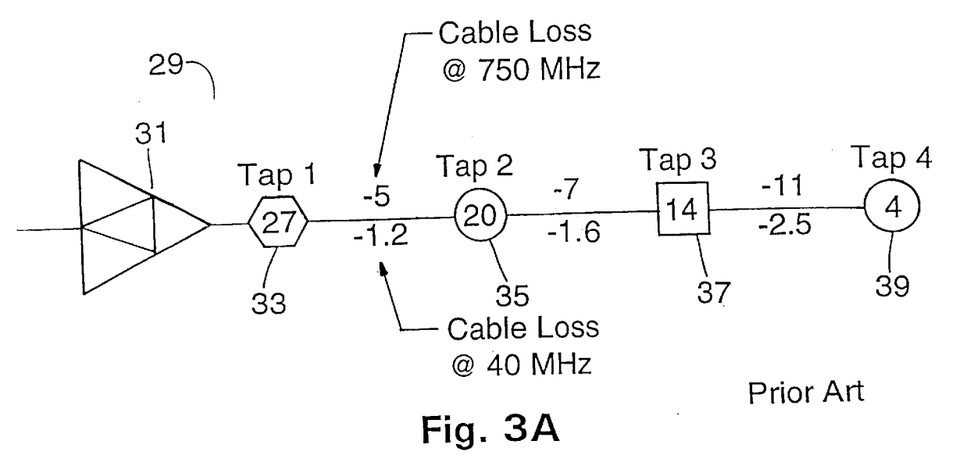
FIG. 3A is a block diagram illustrating a prior art CATV feeder line downstream a bidirectional amplifier.
Figure 3B:
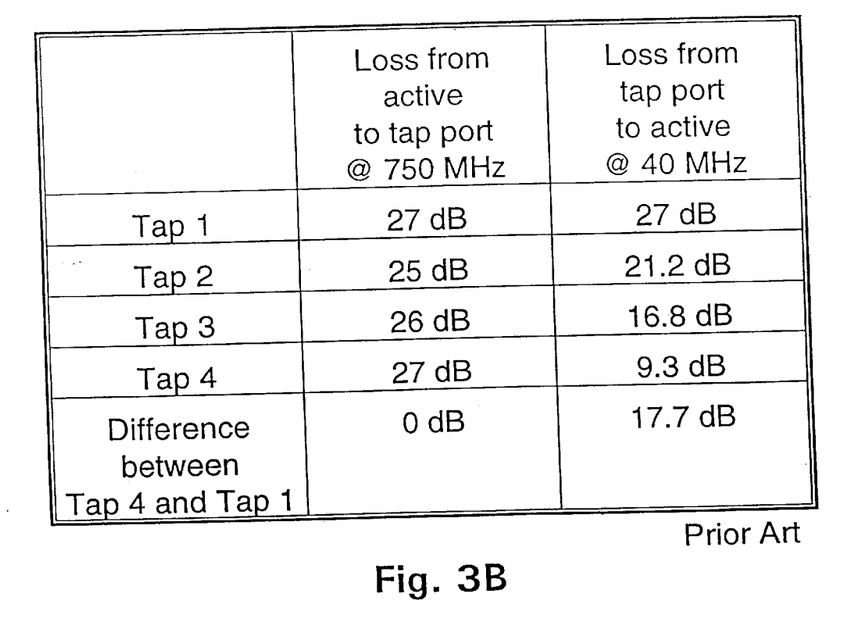
FIG. 3B is a prior art 750 MHz forward frequency and 40 MHz reverse frequency loss comparison table.

With reference to FIG. 3A, a prior art tapped feeder line 29 consisting of a bidirectional amplifier 31 and four subscriber taps 33, 35, 37 and 39 is shown. Referring to FIG. 3B, a corresponding 750 MHz forward frequency and 40 MHz reverse frequency loss comparison table for the prior art tapped feeder line 29 is shown. At 40 MHz, the return signal loss variance between taps 4 (39) and 1 (33) is 17.7 dB. The amount of gain (or loss) in the return path from a particular home to the headend varies from home to home. This diversity of gain can be called gain variance. In addition to the varying loss of the return path due to the system design, other variables such as differences in the subscriber's in-house splitting loss, individual drop lengths, system frequency response, link loss difference, temperature coefficients and headend receiver tolerances all add to the gain variance of the return path.

This gain variance places an extra burden on the design of terminal return transmitters. To compensate for the gain variance in the return path, a terminal return transmitter must have a large range of transmit levels (output power).

One current technique used to compensate for the varying frequency versus attenuation property and to provide the proper signal level is cable equalization. Cable equalization is performed typically within the line amplifiers. Since the forward and reverse frequencies on the cable plant can be separated by using diplex filters, the forward frequencies may be split from the reverse frequencies. By using diplexers, fixed attenuators, separate equalizers and amplifiers for both the forward and reverse frequencies, both directions can be equalized. The forward and reverse equalizers are used to add loss to flatten the frequency response across each respective bandwidth. The equalizer characteristics are the inverse of the cable frequency loss. However, prior art return path line equalization does not address the problem of return frequency gain variance at each subscriber tap.

Figure 4:
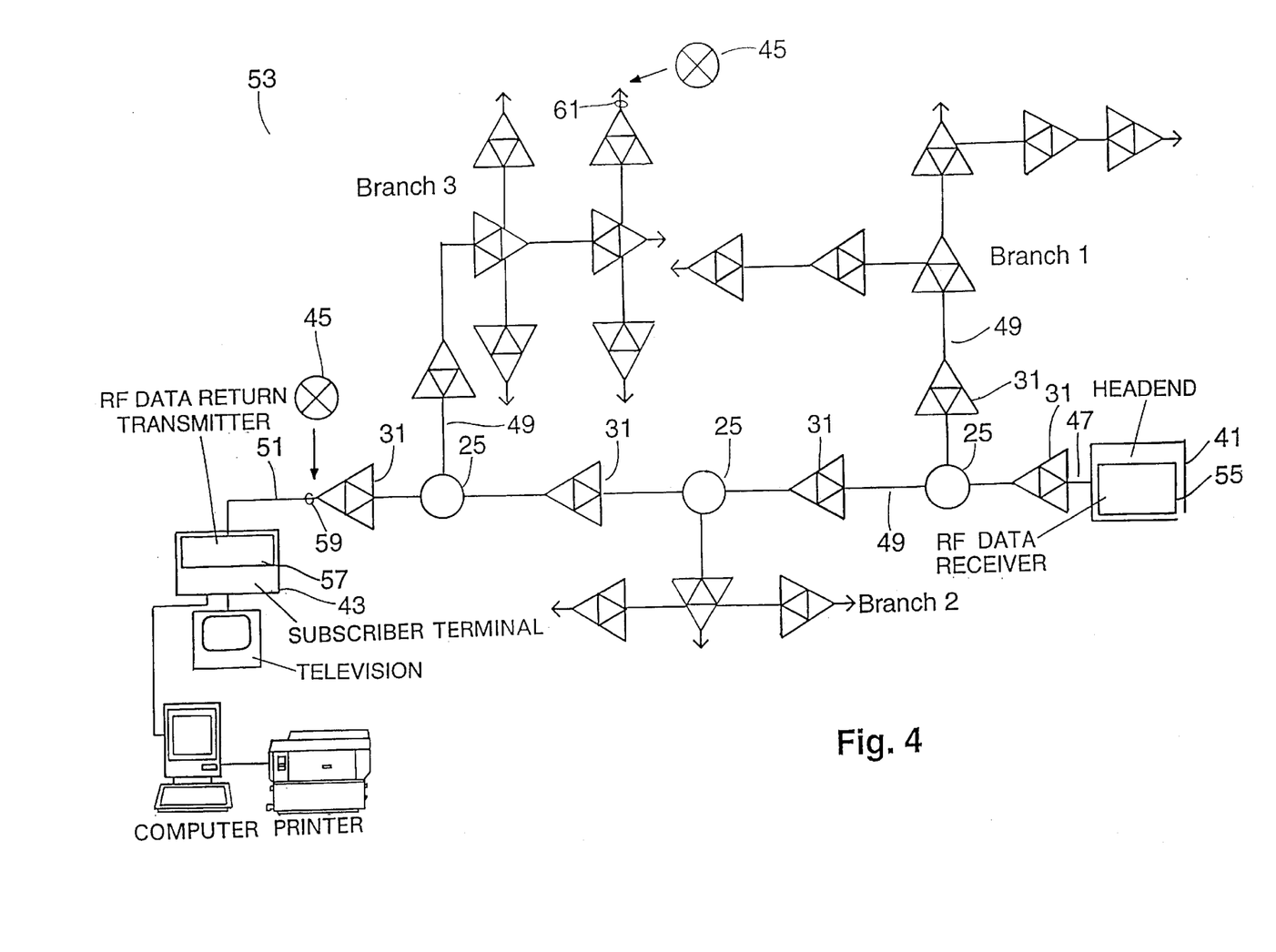
FIG. 4 is a block diagram illustrating a typical CATV forward frequency/return frequency transmission distribution plant.

Another problem is that return frequencies are subject to the combined interference of all the return signals. As shown in FIG. 4, forward frequencies from the headend 41 to a particular subscriber terminal 43 are susceptible to interference 45 along a discrete path defined via the trunk 47, branches 49, and drop lines 51 of the CATV system 53. However, return frequencies are subject to greater interference due to the combination of all the return signals being sent via the system drop lines 51, branches 49 and trunk line 47. Additionally, return signals are also more susceptible to interference because the frequency bandwidth used in the return path transmission overlaps with the frequency bandwidth of off-the-air broadcast signals which propagate around the world.

Figure 5:
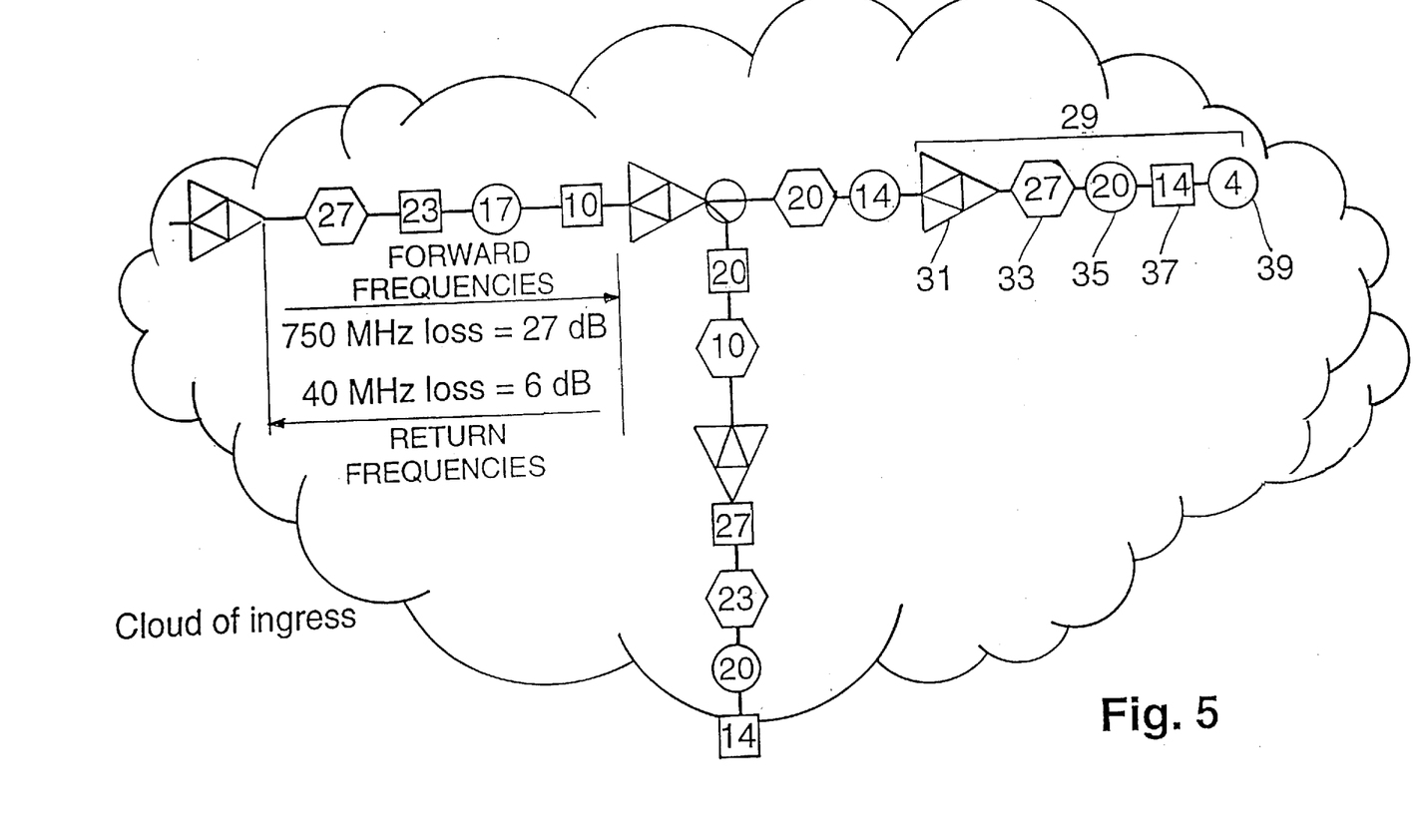
FIG. 5 is a block diagram illustrating the entrance of interferers onto the return path transmission of a CATV distribution plant.

Further compounding this problem is the prior art solution to maintain uniform forward frequency signal levels. By design, subscriber drops at the end of a feeder line will have the lowest tap attenuation values. While this attempts to solve the problem of forward frequency gain variances (referring to the table shown in FIG. 3B), as shown in FIG. 5, and tabulated in FIG. 3B, taps with the lowest attenuation 39 allow the greater ingress of interference on the reverse frequencies than taps having greater attenuation. The lack of an attenuation barrier permits more ingress sources such as CB radios, noise from electrical appliances or discrete sub-band transmitters into the network. Ingress varies with time and is a serious impairment to the operation of the receivers 55 connected to the return path. The return transmission strength from a subscriber's terminal must be sufficiently larger than the ingress to be correctly received at the headend. Since the taps at subscriber homes at the end of a tapped feeder have less attenuation, any ingress originating at these locations dominates the overall system ingress.

Since existing CATV systems will deliver advanced bidirectional services such as interactive television, high-speed data transfer, advanced telephony services, it is desirable to limit the amount of interference in the return path of a CATV system.

SUMMARY OF THE INVENTION

The CATV system of the present invention reduces the overall ingress of the entire CATV system return path and allows a reduction in terminal return transmitter power. The gain variance and ingress reduction system places a calculated loss at each subscriber tap location. By placing these losses at each subscriber location, the headend receives a more consistent return path gain thereby reducing the terminal return transmitter power range requirement. In addition, the losses reduce return path ingress.

Accordingly, it is an object of the present invention to provide a system for reducing gain variances and interference ingress manifest on CATV return signal transmissions.

It is a further object of the invention to provide a method of interference reduction whereby a loss is placed at each subscriber tap location.

It is a further object of the invention to provide a method of interference reduction whereby the loss can be a flat loss or a passive equalizer.

Other objects and advantages of the system and method will become apparent to those skilled in the art after reading the detailed description of the preferred embodiment.

DETAILED DESCRIPTION OF THE PREFERRED EMBODIMENT

The preferred embodiment will be described with reference to the drawing figures where like numerals represent like elements throughout.

With reference to FIG. 4, the topology of a typical CATV distribution plant 53 for distributing cable television signals downstream to a subscriber and for receiving return path messages from a subscriber CATV terminal 43 is shown. The CATV distribution plant 53 connects a headend to a plurality of subscribers through subscriber terminals 43. The distribution plant 53 begins with a coaxial or fiber optic trunk line 47 coupled to the headend 41. Some portions of the CATV plant may use optical fiber cables instead of coaxial transmission cables.

At points where the transmission cable divides, signal splitters/combiners 25 are installed. Drop lines 51, branch lines 49, and trunk line 47 provide the bidirectional transport medium between the headend 41 and subscriber terminals 43 within the CATV system. All components are susceptible to interference ingress. All CATV subscribers typically receive the same broadband CATV signal sent from the headend 41. Signal amplifiers 31 are distributed throughout the cable plant 53 to boost and equalize a transmitted signal and ensure that proper signal strength levels are maintained. Signal amplifiers 31 are capable of bidirectional amplification.

A frequency agile RF data return transmitter 57 is included in each terminal 43 and permits a subscriber to communicate with the headend 41 by transmitting messages in the return direction of the CATV plant 53. The headend 41 includes a frequency agile RF data receiver 55 for receiving messages transmitted by multiple return transmitters 57.

Due to the topology of a CATV plant, noise ingress from all locations on a cable plant 53 accumulates at the headend 41. This noise funneling affects return signal transmissions far more than forward transmissions. For instance, the interference 45 on lines 59 and 61 will combine into the interference at signal splitter 25. As the signals travel toward the headend 41, the noise will be further combined with noise on every other line in the CATV plant 53. Due to this noise accumulation, it can become difficult to discriminate a data signal at the headend 41 from the accumulated noise.

Figure 6A:
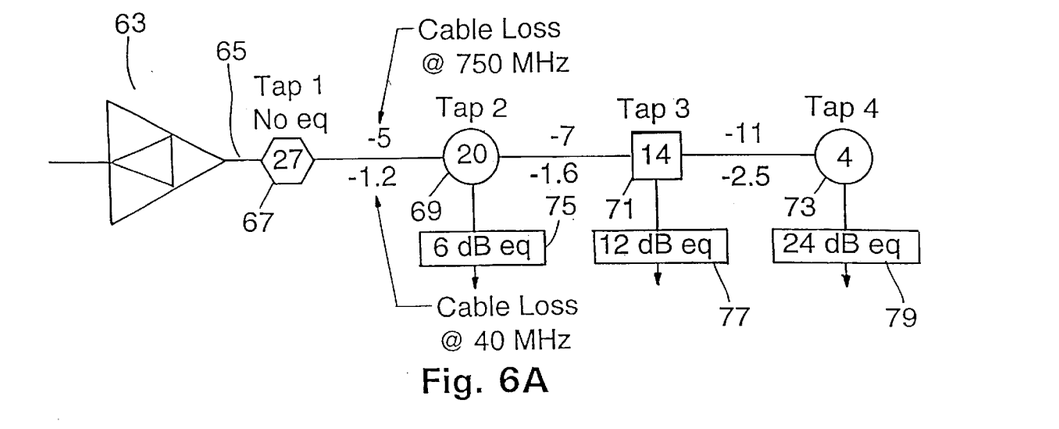
FIG. 6A is a block diagram illustrating a typical CATV feeder line from a bi-directional line amplifier with the preferred embodiment of the present invention.

The gain variance and ingress reduction system 63 of the present invention is shown in FIG. 6A. The distribution of the CATV signal to individual subscribers relies on a coaxial cable 65 that is tapped at specific locations 67, 69, 71 and 73 to provide service to each subscriber. As the cable length increases, lower frequencies are attenuated less than higher frequencies. Since the design of the cable plant insures that tap levels are more constant for forward frequencies, the return frequencies loss from a subscriber tap to an amplifier decreases as more cable is encountered. This is shown in the loss comparison table in FIG. 6B. As a result, there is a large range of losses from any particular tap to the amplifier. This requires that CATV equipment in the home has a large range of transmit levels.

The preferred embodiment equalizes the forward and reverse frequencies at each subscriber tap in addition to relying on forward and reverse equalization performed at a signal amplifier. Each individual subscriber equalizer would be individually calculated in relation to the cable loss downstream of the previous line amplifier. This technique maintains a uniform forward and reverse frequency loss. Additionally, each passive equalizer reduces the ingress originating at each subscriber location from entering the cable plant.

Figure 6B:
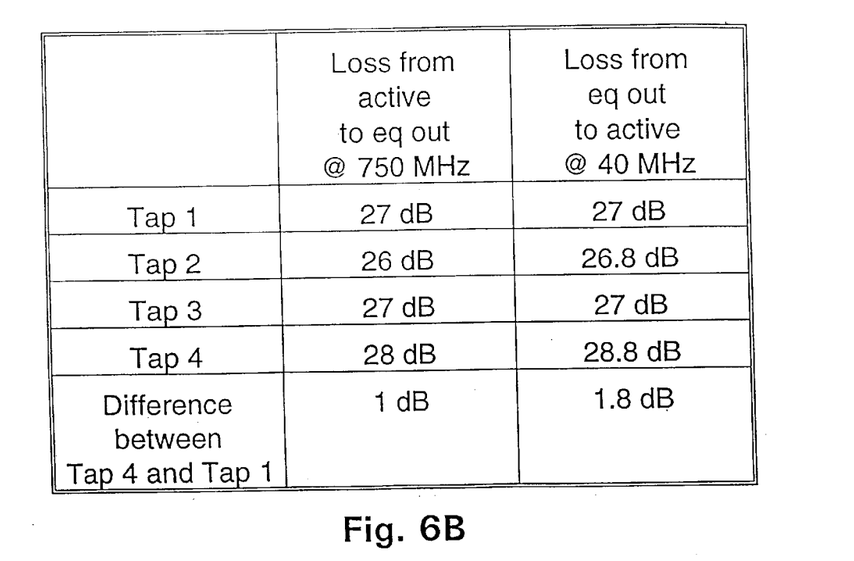
FIG. 6B is a 750 MHz forward frequency and 40 MHz reverse frequency loss comparison table.

As shown in FIG. 6B, tap losses are designed so that a more constant signal level is maintained at each subscriber tap port, regardless of how much cable exists between a specific tap and the previous amplifier. As cable and tap insertion losses increase, lower tap values must be used. The level at 750 MHz at each tap is held relatively more constant. Eventually, the levels at low frequencies must be attenuated. This is accomplished by the equalizers 75, 77 and 79 (EQ). In this embodiment, the equalizers are chosen in 6 dB steps. At 40 MHz, the return signal loss variance between taps 4 (73) and 1 (67) is only 1.8 dB.

Preferably a loss is placed at each subscriber's tap port or at the side of or inside of each home. The loss could be of two general types: 1) flat loss in the return band, or 2) a broadband passive equalizer which has highest loss in the return band.

Figure 7:
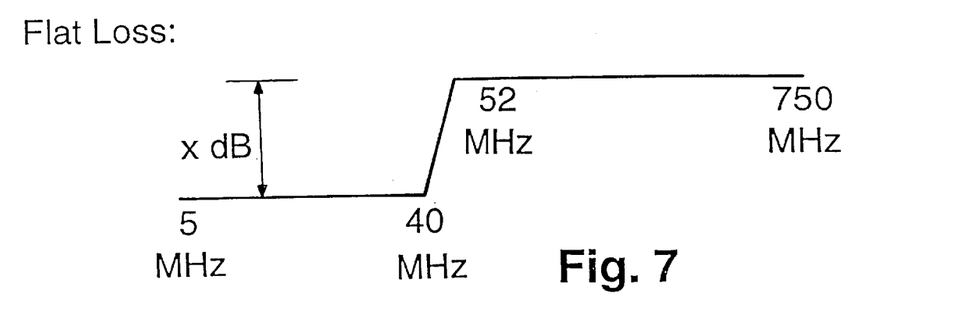
FIG. 7 is a magnitude v. frequency plot of a flat loss.

Referring to FIG. 7, the filter characteristic of the flat loss has more constant loss in the return frequencies and a minimal loss in the forward frequencies. The crossover slope occurs within the guard band. The amount of loss in the return band will be one of several standard values with the closest one being chosen for each particular tap location.

Figure 8:
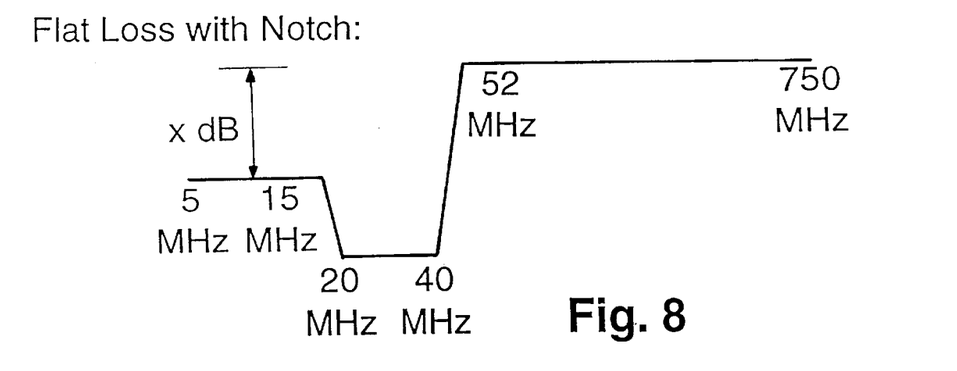
FIG. 8 is a magnitude v. frequency plot of a flat loss with notch.

As shown in FIG. 8, the filter characteristic of the flat loss with notch is similar to the flat loss filter, however, a particular portion of the return frequency spectrum is blocked. The notch will completely block any ingress at the notch frequencies from a particular home. In this manner, subscribers not needing access to a particular portion of the return path do not contribute to overall system ingress in the blocked frequency range.

Figure 9:
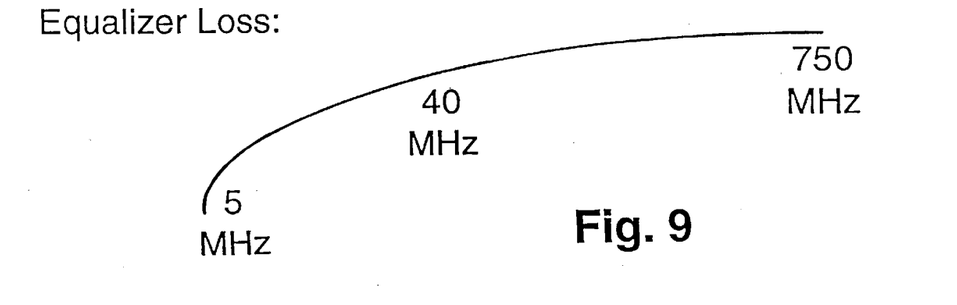
FIG. 9 is a magnitude v. frequency plot of an equalizer loss.

Referring to FIG. 9, the equalizer characteristic is the inverse of cable frequency response. The equalizer compensates for the cable which is between the respective tap and the next upstream amplifier. The amount of equalization will be one of several standard dB values with the closest one being chosen for each particular tap location.

A variation of the passive equalizer is an equalizer with specific notched return frequencies. In this embodiment, subscriber contributions to ingress can be reduced. Moreover, ingress at a particular portion of the return frequency spectrum is blocked.

As one skilled in the art can appreciate, each of the above loss types can be fixed or variable. Depending upon the specific requirements, either type can be used allowing greater flexibility.

Any of the above embodiments can be located in one of four subscriber areas: 1) outside the subscriber's home near the subscriber signal splitter or at the ground block; 2) inside the subscriber's home coupled to his terminal; 3) within the feeder tap between the directional coupler and signal splitter; or 4) coupled to each tap "F" port of the feeder tap.

In the first location, the loss device is placed at the side of a subscriber home. This location will block the ingress from the home into the cable plant but not from the drop cable leading to the subscriber tap. Each subscriber may have the device tailored to the services being offered.

In the second location the loss device is coupled to a subscriber terminal inside of the home. This location will not significantly reduce ingress but will decrease gain variance. Similarly, each subscriber may have the device tailored to the services being offered to his home.

Figure 10:
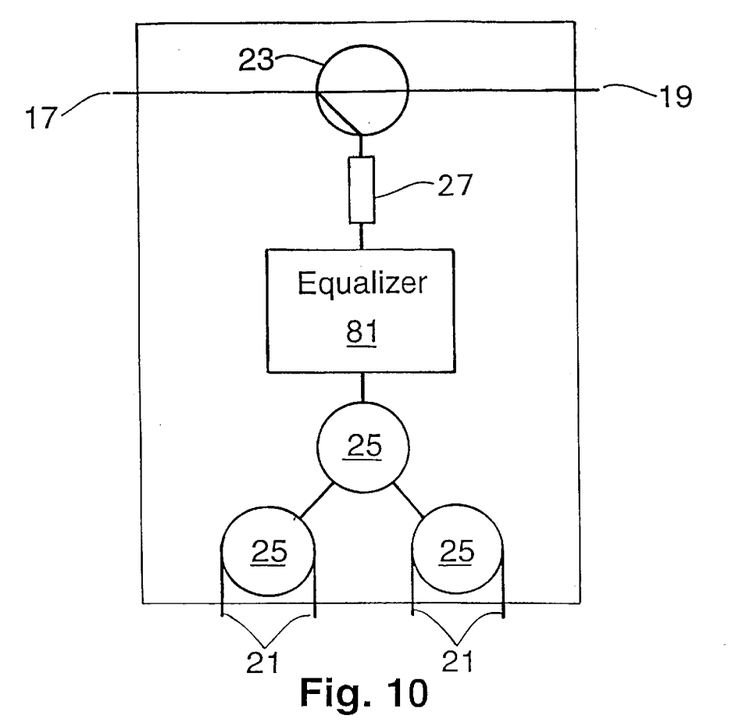
FIG. 10 is a block diagram of an alternative location for the present invention.

With reference to FIG. 10, in the third location, the loss device 81 is located inside the tap and coupled between the directional coupler and splitter. In this location, the filter can not be tailored to each individual subscriber served by the common tap, however, only one loss device is required per tap instead of one per tap "F" port.

Figure 11:
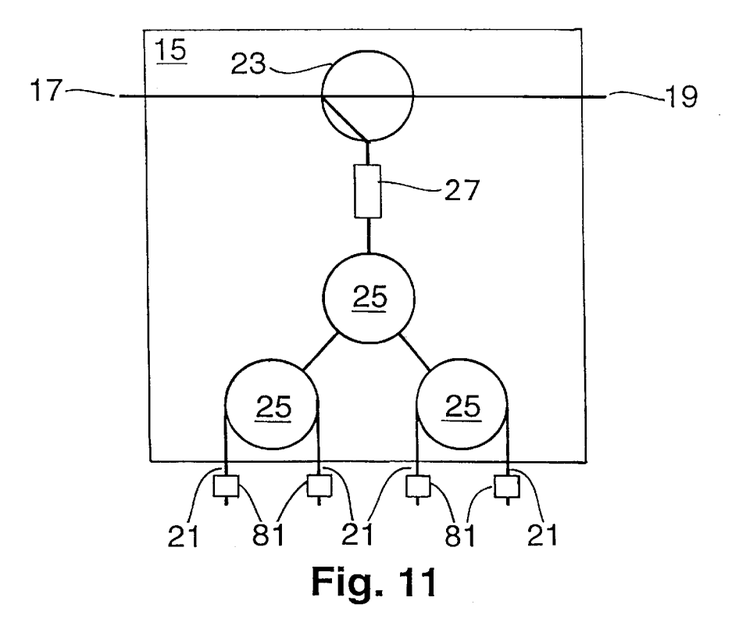
FIG. 11 is a block diagram of an alternative location for the present invention.

With reference to FIG. 11, in the fourth location, the loss device 81 is placed at the output of each tap "F" port. This location will block the ingress from both the home and the drop cable. Each subscriber may have a device installed that is tailored to the subscribed services being offered.

Greater flexibility can be achieved by combining one of the above loss locations with another. Depending upon the services desired by a particular subscriber and the response needed to equalize the return frequency gain, a subscriber tap having a plurality of "F" ports servicing multiple subscribers can have losses placed in a variety of locations. One subscriber may have a particular loss type located at the subscriber tap, another subscriber may have a loss type located within the subscriber's home and yet another subscriber may have a loss located at the subscriber's signal splitter or ground block.

While specific embodiments of the present invention have been shown and described, many modifications and variations could be made by one skilled in the art without departing from the spirit and scope of the invention. The above description serves to illustrate and not limit the particular form in any way.

I claim:

1. A CATV system having a network of communication paths for upstream and downstream communications between a headend and a plurality of subscriber terminals such that a communication path is provided between the headend and each subscriber terminal, the system comprising:

for each of a plurality of selected subscriber terminals, an associated loss means disposed within the communication path for each selected subscriber terminal for attenuating upstream communication signals between said selected subscriber terminal and said headend; and each said loss means selected for equalizing gain between upstream communication signals originating from different ones of said selected subscriber terminals.

2. The CATV system according to claim 1 wherein:

the communication path of a first selected subscriber terminal includes a first subscriber tap having a plurality of tap ports;

said first selected subscriber terminal is coupled to one of said first subscriber tap ports;

a first loss means associated with said first selected subscriber terminal disposed within or downstream of said first subscriber tap;

the communication path of a second selected subscriber terminal includes said first subscriber tap and, downstream therefrom, a second subscriber tap having a plurality of ports;

said second selected subscriber terminal is coupled to one of the ports of said second subscriber tap; and a second loss means associated with said second selected subscriber terminal disposed within or downstream said second subscriber tap.

3. The CATV system according to claim 2 wherein said first loss means is situated between said first tap and said first subscriber terminal.

4. The CATV system according to claim 3 wherein said second loss means is situated between said second tap and said second subscriber terminal.

5. The CATV system according to claim 2 wherein said first loss means is situated proximate to said first subscriber terminal.

6. The CATV system according to claim 5 wherein said second loss means is situated proximate to said second subscriber terminal.

7. The CATV system according to claim 2 wherein said first loss means is situated proximate to said first subscriber tap ports.

8. The CATV system according to claim 7 wherein said second loss means is situated proximate to said second subscriber tap ports.

9. The CATV system according to claim 2 wherein said first loss means is located within said first subscriber tap and said second loss means is located within said second subscriber tap.

10. The CATV system according to claim 2 wherein upstream communication signals are transported within a predetermined range of upstream frequencies and downstream communication signals are transported within a predetermined range of downstream communication frequencies which are higher than the upstream communication frequencies and wherein said first subscriber tap has a different attenuation value than said second subscriber tap for equalizing downstream communication signal gain.

11. The CATV system according to claim 10 wherein at least one of said loss means is a filter having a flat loss in the upstream frequencies and a minimal loss in the downstream frequencies.

12. The CATV systems according to claim 10 wherein at least one of said loss means is a filter having a flat loss with a notch in the upstream frequencies and a minimal loss in the downstream frequencies and said notch blocks a particular portion of said upstream frequency range.

13. The CATV system according to claim 2 wherein the communication path of said first subscriber terminal has a response characteristic at the location of said first loss means and said first loss means has a response characteristic the inverse of said first communication path response characteristic.

14. The CATV system according to claim 2 wherein said loss means is an equalizer with a specific notched return frequency; and said specific notch blocking a particular portion of said upstream communication signals.

15. A CATV subscriber tap for use in a CATV system comprising:

an input signal port;

a plurality of subscriber ports;

a directional coupler;

a signal splitter;

an attenuation means selected for equalizing gain between downstream communication signals to different subscriber taps; and a loss means selected for equalizing gain between upstream communication signals from different subscriber taps.

16. The CATV subscriber tap according to claim 15 further comprising an output signal port.

17. The CATV subscriber tap according to claim 15 wherein said loss means is an equalizer.

18. The CATV subscriber tap according to claim 15 wherein said loss means is an equalizer with notch.

19. The CATV system according to claim 1 wherein said loss means is fixed.

20. The CATV system according to claim 1 wherein said loss means is variable.

21. In a CATV system having a network of communication paths for upstream and downstream communications between a headend and a plurality of subscriber terminals such that a communication path is provided between the headend and each subscriber terminal, a method comprising:

for each of a plurality of selected subscriber terminals providing an associated loss means for attenuating upstream communication signals between said selected subscriber terminal and said headend; and selecting each of said loss means for equalizing gain between upstream communication signals originating from different ones of said selected subscriber terminals; and disposing each said loss means within the communication path for each selected subscriber terminal.

\* \* \* \* \*

UNITED STATES PATENT AND TRADEMARK OFFICE
CERTIFICATE OF CORRECTION

PATENT NO : 5,835,844
DATED : November 10, 1998
INVENTOR(S): Stoneback et al.

It is certified that error appears in the above-identified patent and that said Letters Patent is hereby corrected as shown below:

In claim 2, at column 7, line 25, piror to "associated" insert --is--.

In claim 2, at column 7, line 34, piror to "associated" insert --is--.

In claim 2, at column 7, line 36, after "downstream" insert --from--.

In claim 12, at column 8, line 8, delete "systems" and insert therefor --system--.

In claim 14, at column 8, line 23, delete "blocking" and insert therefor --blocks--.

Signed and Sealed this

Twenty-fourth Day of August, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,835,844
DATED : November 10, 1998
INVENTOR(S) : Stoneback et al.

It is certified that error appears in the above-identified patent and that said Letters Patent is hereby corrected as shown below:

at column 5, line 31, delete "6B" and insert therefor --3B--.

In claim 2, at column 7, line 25, piror to "associated" insert --is--.

In claim 2, at column 7, line 34, piror to "associated" insert --is--.

In claim 2, at column 7, line 36, after "downstream" insert --from--.

In claim 12, at column 8, line 8, delete "systems" and insert therefor --system--.

In claim 14, at column 8, line 23, delete "blocking" and insert therefor --blocks--.

UNITED STATES PATENT AND TRADEMARK OFFICE

CERTIFICATE OF CORRECTION

PATENT NO. : 5,935,844

DATED : August 10, 1999

INVENTOR(S) : M. MATSUMURA et al.

It is certified that error appears in the above-identified patent and that said Letters Patent is hereby corrected as shown below:

In Claim 9, at column 28, line 19 delete "(P -carboxyethyl)" and insert therefor --(β-carboxyethyl)--.

Signed and Sealed this

First Day of February, 2000

Attest:

Q. TODD DICKINSON

*Attesting Officer*     *Acting Commissioner of Patents and Trademarks*